United States Patent
Babu et al.

(10) Patent No.: US 7,139,252 B2
(45) Date of Patent: Nov. 21, 2006

(54) SYSTEM AND METHOD FOR AGGREGATING INFORMATION TO DETERMINE USERS' LOCATIONS

(75) Inventors: Anand Naga Babu, Peoria, IL (US); Abraham S. Heifets, Menlo Park, CA (US); Adam Krauszer, Ithaca, NY (US); Roy Paterson, Austin, TX (US); Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/773,194

(22) Filed: Jan. 31, 2001

(65) Prior Publication Data

US 2002/0145984 A1 Oct. 10, 2002

(51) Int. Cl.
*H04H 1/00* (2006.01)
*H04Q 7/00* (2006.01)

(52) U.S. Cl. .......... 370/312; 370/313; 370/338; 455/404.2; 455/456.1; 342/357.1; 342/357.14; 340/539.2; 340/539.13

(58) Field of Classification Search .......... 370/312, 370/313, 314, 338, 349; 709/224, 249, 217; 455/404.1–404.2, 456.1–456.6, 457, 405–408, 455/412.1, 0.5, 461, 452.6; 342/357.01–357.18; 340/539.2, 539.13
See application file for complete search history.

(56) References Cited

U.S. PATENT DOCUMENTS

| | | | |
|---|---|---|---|
| 5,717,406 A | * | 2/1998 | Sanderford et al. ......... 342/457 |
| 5,758,313 A | * | 5/1998 | Shah et al. .............. 455/456.2 |
| 5,872,539 A | * | 2/1999 | Mullen ................. 342/357.08 |
| 5,959,580 A | * | 9/1999 | Maloney et al. ............ 342/457 |
| 6,177,905 B1 | * | 1/2001 | Welch .................... 342/357.13 |
| 6,212,392 B1 | * | 4/2001 | Fitch et al. .............. 455/456.2 |
| 6,259,891 B1 | * | 7/2001 | Allen ....................... 455/3.02 |

(Continued)

FOREIGN PATENT DOCUMENTS

JP     2000-102058     4/2000

(Continued)

OTHER PUBLICATIONS http://www.bfound.com/fleet_tracking.html, accessed on Dec. 4, 2000.

(Continued)

*Primary Examiner*—Doris H. To
*Assistant Examiner*—Ian N. Moore
(74) *Attorney, Agent, or Firm*—Mark S. Walker; Gregory K. Goshorn; Greg Goshorn, P.C.

(57) ABSTRACT

Provided is a system and method that acquires and aggregates information to determine the location of a user. Information from multiple sources is collected and evaluated. Location sources include mobile electronic devices such as mobile telephones, cell phones, hand-held computers, personal digital assistants, pagers, Global Positioning System (GPS) devices, and other pervasive computing devices. Satellite-based or network-based positioning technologies make it possible to determine the geographic location of these wireless electronic devices and their corresponding user. Location sources also include computer-based models, schedules or calendars that give a particular user's expected location depending on the date and time. Provided is a method for aggregating information to determine a user's location. Also provided is a system for executing the claimed method. Also provided is as a set of instructions on a computer-usable medium, or resident in a computer system, for executing the claimed method.

29 Claims, 7 Drawing Sheets

U.S. PATENT DOCUMENTS

| | | | |
|---|---|---|---|
| 6,292,657 B1 * | 9/2001 | Laursen et al. | 455/411 |
| 6,321,092 B1 * | 11/2001 | Fitch et al. | 455/456.5 |
| 6,424,840 B1 * | 7/2002 | Fitch et al. | 455/456.1 |
| 6,433,735 B1 * | 8/2002 | Bloebaum et al. | 342/357.1 |
| 6,609,004 B1 * | 8/2003 | Morse et al. | 455/456.5 |
| 6,625,457 B1 * | 9/2003 | Raith | 455/456.1 |
| 6,628,938 B1 * | 9/2003 | Rachabathuni et al. | 455/456.3 |
| 6,662,016 B1 * | 12/2003 | Buckham et al. | 455/457 |
| 6,738,628 B1 * | 5/2004 | McCall et al. | 455/456.1 |
| 6,795,858 B1 * | 9/2004 | Jain et al. | 709/226 |
| 2002/0160745 A1 * | 10/2002 | Wang | 455/404 |

FOREIGN PATENT DOCUMENTS

| | | |
|---|---|---|
| JP | 2000-138961 | 5/2000 |
| WO | WO 98/10538 | 3/1998 |
| WO | WO 98/10538 A1 | 3/1998 |
| WO | WO 00/27143 | 5/2000 |
| WO | WO 00/27143 A1 | 5/2000 |
| WO | WO 01/31965 A1 | 5/2001 |

OTHER PUBLICATIONS http://www.signalsoftcorp.com/products/location_manager.html, accessed on Dec. 4, 2000.

http://www.signalsoftcorp.com/products/tracking.html, accessed on Dec. 4, 2000.

European Patent Office, International Preliminary Examination Report PCT/GB02/00340, May 9, 2003.

* cited by examiner

SAMPLE LOCATION XML DOCUMENT

```xml
-<LocationInformation>                                                                                                            ← 811
 -<MobileDevice TrackID="1234567890" RequestTime="20000626115751+-0800" ErrorCode="0">
  -<Geographic Velocity="0" PositionTime="20000626115751+-0800">
   -<GeodeticDatum>
    -<WGS-84>
                                                                                                     832
     <LatLong PositionFormat="IDM80" Latitude="N374820" Longitude="W1222738" />        ← 833
    </WGS-84>
   </GeodeticDatum>
   <HeightDatum HeightFormat="meters" HeightValue="500" />
   <Region RadiusFormat="meters" InnerRadius="0" OuterRadius="100" StartAngle="0" StopAngle="360"
     LevelOfConfidence="100" />
  </Geographic>
  <TowerID PositionTime="20000626115751+-0800" Name="95110" Type="ZIP" />              ← 872
 </MobileDevice>                                                                         ← 871
</LocationInformation>
```

SYSTEM AND METHOD FOR AGGREGATING INFORMATION TO DETERMINE USERS' LOCATIONS

CROSS-REFERENCES TO RELATED APPLICATIONS

The present application is related to a co-pending application entitled System and Method for Handling Location Information, Ser. No. 09/733,193, filed on even date herewith, assigned to the assignee of the present application, and herein incorporated by reference.

FIELD OF THE INVENTION

The present invention relates generally to information handling systems and more particularly to methods and systems that aggregate information to determine users' locations.

BACKGROUND OF THE INVENTION

Mobile, wireless electronic devices such as mobile telephones, personal digital assistants, and Global Positioning System (GPS) devices, have become very popular, and their use has become very common. It is common for one person to use two or more of these devices. These mobile devices are a subset of a group of devices that are sometimes called "pervasive computing" devices. The term "pervasive computing" is used because systems with microprocessors are now found in an array of devices that previously were largely untouched by computer technology. These pervasive computing devices include mobile devices such as cell phones and automobile components. Pervasive computing devices often include a microprocessor and associated volatile and non-volatile memory, input means, output means, and interfaces, such as a network interface or modem, providing a link to other computing devices.

These pervasive computing devices are information handling systems, designed to give independent computing power to a single user, or a group of users in the case of networked pervasive computing devices. Pervasive computing devices may also include one or more input/output devices which are coupled to the microprocessor and which perform specialized functions (e.g. modems, sound and video devices, or specialized communication devices). Pervasive computing devices are often linked to computing systems and other pervasive computing devices using a network, such as a local area network (LAN), wide area network (WAN), or the Internet.

Satellite-based or network-based positioning technologies make it possible to determine the geographic location of mobile pervasive computing devices (e.g. location-based services for users of mobile telephones use such positioning technologies). One problem is that location information from one source may be inconsistent with information from another source. For example, a husband and wife may share a tracking device that is embedded in their car. In addition, the husband may have a location-aware mobile phone. The wife may use the car to drive to the wife's office, after giving the husband a ride to his office. Then information from the mobile phone, indicating that the husband is at his office, will be inconsistent with information from the tracking device in the car, indicating that the husband is at the wife's office.

Such an inconsistency could cause significant, practical problems. To continue the example, the husband's employer may use location information from employees' mobile electronic devices to determine the employees' location. This system would help the employer make good decisions about dispatching employees to make sales calls or service calls. However, this system could be defeated when information from one source indicates that the husband is at his office, and information from another source indicates that the husband is at the wife's office.

The inconsistency would be difficult to resolve, without additional information about the people involved, their schedules, and how they are associated with various mobile devices. To make the best use of these positioning technologies, it would be important to make use of all available information, from multiple sources, to determine users' locations. Thus there is a need for methods and systems that acquire, aggregate, and evaluate location information from multiple sources. There is a need for methods and systems that go beyond just locating a mobile device, to also include information about people, their schedules, and their various devices.

SUMMARY OF THE INVENTION

The present invention is a system and method that acquires and aggregates information, organized by user, to determine users' locations. If properly handled, such location information can be very useful. One example, dispatching employees to make sales calls or service calls, was mentioned above. The goal of the present invention is to allow users to collect and evaluate information from multiple sources, and thus make proper use of all available location information.

Without such a method or system, positioning technologies cannot properly handle multiple location sources for a single user, or a single location source shared by multiple users. Without such a method or system, users would be left with the above-mentioned problem of location information from one source being inconsistent with information from another source.

The solution is to make proper use of all available location information, by first collecting and then evaluating information from multiple sources. Information from some sources generally would be more reliable than others. For example, information from a device that is not shared may be more reliable than information from a device that is shared by more than one user. Information from a device that recently changed position may be more reliable than information from a device that has not recently changed position.

Instead of merely locating a mobile device, the present invention locates people, i.e. users who may have more than one mobile device, and perhaps computerized calendars that indicate a person's expected location. The electronic sources of location data (hereafter referred to as "location sources") for the present invention include mobile electronic devices such as mobile telephones, personal digital assistants, Global Positioning System (GPS) devices, and other pervasive computing devices. Location sources also include computer-based models, schedules or calendars that give a person's expected location depending on the date and time. These models, schedules or calendars may be stored on personal digital assistants, desk-top computers, or servers, for example.

After location information is acquired from location sources, a user who is tracking the locations of other users might evaluate the collected location information himself or herself, or evaluation could be automated. In a fully automated system, a computer would perform ranking or filtering operations on the data before providing the information to the user.

One aspect of the present invention is a method for aggregating information to determine users' locations. Another aspect of the present invention is a system for executing the method of the present invention. A third aspect of the present invention is as a set of instructions on a computer-usable medium, or resident in a computer system, for executing the method of the present invention.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

Overview

The present invention is a system and method that acquires and aggregates location information. A user might evaluate the collected location information himself or herself, or evaluation could be automated. The present invention could be useful in any situation involving location information from multiple sources. One example, a system using collected location information for dispatching employees to make sales calls or service calls, is mentioned above. Another example would be a system to alert a first user that a second user of particular interest has arrived at a meeting site. Another example would be a system interacting via the World Wide Web with a user's hand-held computer, his computer-based calendar, his GPS unit, and a map service, to provide appropriate driving directions to his next meeting site. Another example would be a system interacting via the World Wide Web with a user's cell phone, and her computer-based calendar or to-do list, alerting a mobile user when she approaches a site where some business needs to be transacted. In these examples, information output could be audible or visible, by text or graphics.

In these examples, note that a user would be provided with useful information, keyed to a user's actual location, and the user would not need to make a query. Also note the importance of using all available location information, from multiple sources, organized by user.

The following are definitions of terms used in the description of the present invention and in the claims. "Computer-usable medium" means any signal or transmission facility for communication with computers, and any kind of computer memory, such as floppy disks, hard disks, Random Access Memory (RAM), Read Only Memory (ROM),CD-ROM, flash ROM, non-volatile ROM, and non-volatile memory. "Location data" or "location information" means latitude and longitude, or any other descriptions of location. "Location sources" or "Location source" means any electronic source of location data, including mobile electronic devices such as mobile telephones, personal digital assistants, pagers, Global Positioning System (GPS) devices, servers associated with these mobile electronic devices, and computer-based models, schedules or calendars that give a person's expected location depending on the date and time. "Organized by user," concerning collections of location data, means that for each collection, the elements of the collection pertain to a certain user, who is being tracked. "Users" or "user" means any person utilizing location sources being tracked by the method or system of the present invention, and any person tracking the locations of other users.

System and Method

Figure 1:
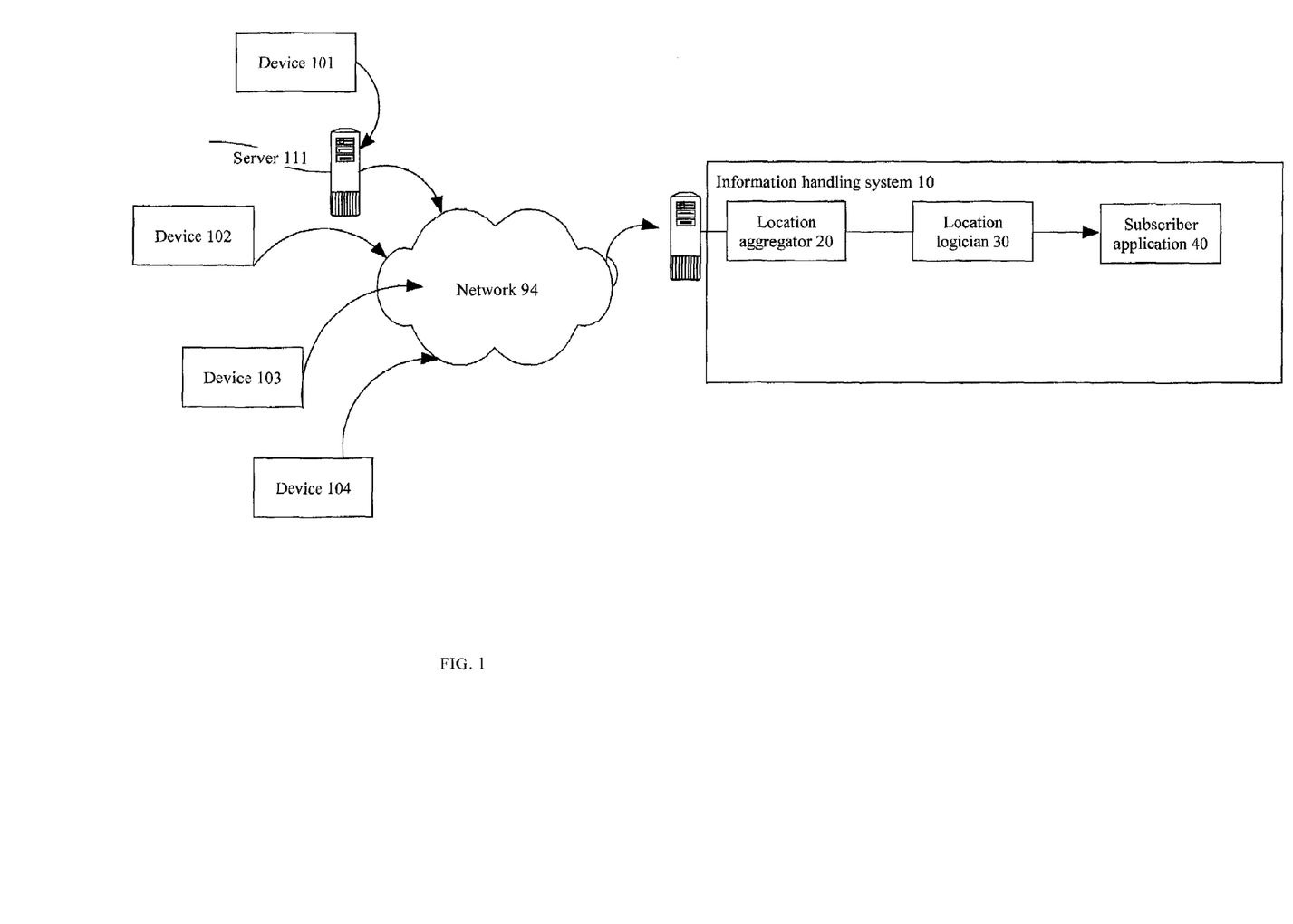
FIG. 1 is an exemplary block diagram of location data being delivered over a computer network with an information handling system, according to the teachings of the present invention.

The present invention is not limited as to the type of computer on which it runs. Referring now to FIG. 1, an exemplary block diagram shows location data being delivered over a computer network with an information handling system, according to the teachings of the present invention. At the left side of FIG. 1, location information is acquired from location sources: device 101, server 111, device 102, device 103, and device 104. Location data is delivered over a computer network 94 to information handling system 10. Within information handling system 10, location aggregator 20 acquires location data regarding a user, or more than one user, and creates collections of said location data regarding a user, or more than one user, organized by user. In this example, evaluation of the collected location information is automated. A logic component, location logician 30, performs evaluation (ranking, filtering, or consolidating operations) on the data before providing the information to a user through a subscriber application 40.

Figure 2:
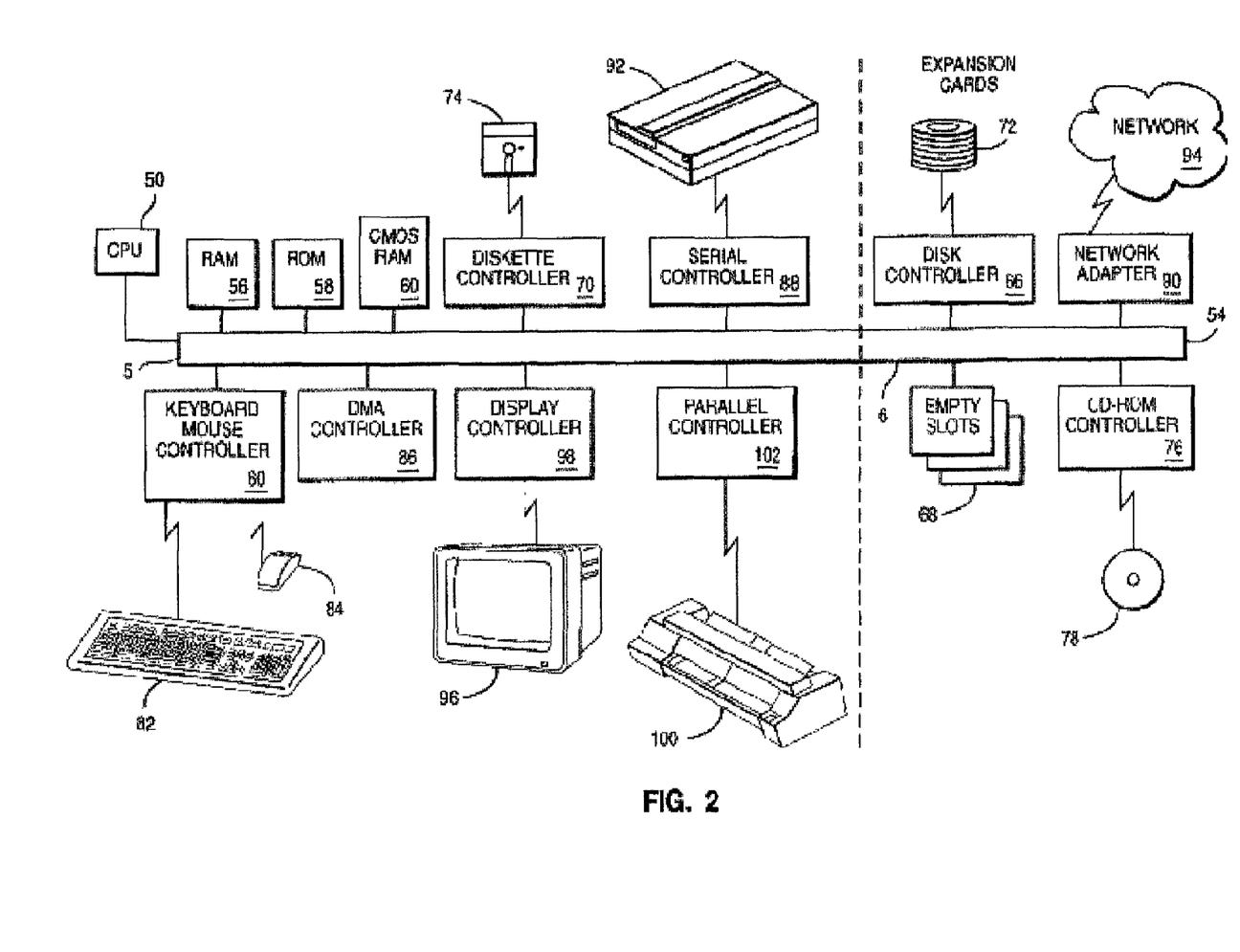
FIG. 2 is a high-level block diagram illustrating selected components that may be included in the exemplary information handling system of FIG. 1.

Referring now to FIG. 2, a high-level block diagram illustrates selected components that may be included in the exemplary information handling system 10 of FIG. 1. Information handling system 10 is controlled primarily by computer readable instructions, which may be in the form of software, wherever, or by whatever means such software is stored or accessed. Such software may be executed within the processor, also known as the Central Processing Unit (CPU), 50 to cause information handling system 10 to do work. CPU 50 typically is a microprocessor of the kind available from Intel Corporation or Advanced Micro Devices, Inc.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not lose data when power is removed from it. Non-volatile memories include ROM, EPROM, flash memory, or battery-pack CMOS RAM. As shown in FIG. 2, such battery-pack CMOS RAM may be used to store configuration information. An expansion card or board is a circuit board that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. Thus, empty slots 68 may be used to receive various types of expansion cards or PC cards. Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning a read/write head. A single disk controller may be able to control more than one disk drive. CD-ROM controller 76 may be included in information handling system 10 for reading data from CD-ROM 78 (compact disk read only memory). Such CD-ROMs use laser optics rather than magnetic means for reading data.

Communication between information handling system 10 and other information handling systems may be facilitated by serial controller 88 and network adapter 90, both of which are coupled to system bus 5. Serial controller 88 is used to transmit information between computers, or between a computer and peripheral devices, one bit at a time over a single line. As illustrated, such a serial interface may be used to communicate with modem 92. A modem is a communication device that enables a computer to transmit information over a standard telephone line. Modems convert digital computer signals to analog signals suitable for communications over telephone lines. Modem 92 or network adapter 90 may provide a connection to sources of software and information, such as a server, an electronic bulletin board, the Internet or World Wide Web. Network adapter 90 is a communication device that may be used to connect information handling system 10 to a network 94. Network 94 may provide computer users with means of communicating and transferring software and information electronically. Additionally, network 94 may provide distributed processing, which involves several computers in the sharing of workloads or cooperative efforts in performing a task.

Keyboard mouse controller 80 is provided in information handling system 10 for interfacing with keyboard 82 and pointing device 84, which may be implemented using a track ball, a joy stick, touch sensitive tablet or screen, or as illustrated, a mouse. The pointing device 84 may be used to move a pointer or cursor visible on display 96. Another example of an input device would be a microphone for audio input. It should be noted and recognized by those persons of ordinary skill in the art that display 96, keyboard 82, and pointing device 84 may each be implemented using any one of several known off-the-shelf components.

Display 96, which is controlled by display controller 98, is used to display visual output generated by information handling system 10. Display 96 includes a display screen, which may be implemented using a cathode ray tube (CRT) a liquid crystal display (LCD) an electrode luminescent panel or the like. Display controller 98 includes electronic components required to generate a video signal that is sent to display 96. Printer 100 may be coupled to information handling system 10 via parallel controller 102. Parallel controller 102 is used to send multiple data and control bits simultaneously over wires connected between system bus 5 and another parallel communication device, such as printer 100. Another example of an output device would be a speaker for audio output.

CPU 50 fetches, decodes, and executes instructions, and transfers information to and from other resources via the computer's main data-transfer path, system bus 5. Such a bus connects the components in an information handling system 10 and defines the medium for data exchange. System bus 5 connects together and allows for the exchange of data between memory units 56, 58, and 60, CPU 50, and other devices as shown in FIG. 2.

Figure 3:
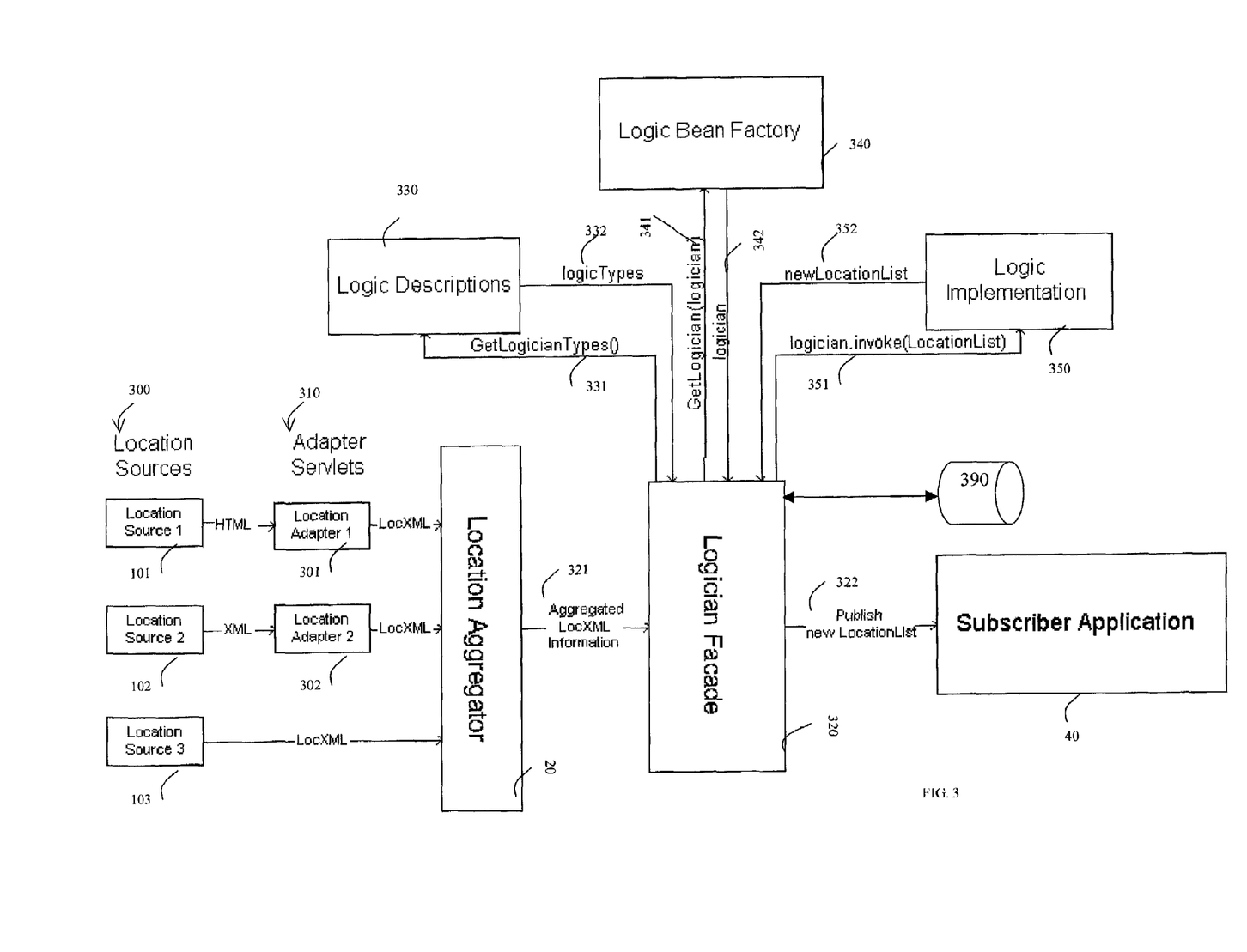
FIG. 3 is a high-level block diagram illustrating an example of a system for acquiring, aggregating, and evaluating location information, according to the teachings of the present invention.

Referring now to FIG. 3, a diagram is shown illustrating an example of a system for acquiring, aggregating, and evaluating location information, according to the teachings of the present invention. In the invention as currently implemented, the Java programming language was used, but other languages could be used. At the left side of FIG. 3, location information is acquired from a group of location sources 300, including location source 101, location source 102, and location source 103, in this example.

Output from location sources 300 could be in hypertext markup language (HTML), extensible markup language (XML), or some other language. In the invention as currently implemented, location information is acquired through a set of adapter servlets 310, including adapter 301 and adapter 302, in this example. These adapters convert location data from various location sources to a single format. In the invention as currently implemented, the single format was one implemented in XML, named "Location XML," or "LocXML." Location data also could be acquired directly, as from location source 103, in this example. Further description of adapters is given below, in connection with FIG. 4.

Location aggregator 20 acquires location data regarding a user, or more than one user, and creates collections of said location data regarding a user, or more than one user, organized by user. Collections of location data, shown as aggregated LocXML information 321, are sent to logician facade 320, which communicates with logic descriptions 330, logic bean factory 340, and logic implementation 350. These are described in more detail below. These function to perform evaluation (ranking, filtering, or consolidating operations) on the data before providing the information to a user, by publishing new location list 322 to subscriber application 40. In another embodiment, some ranking or filtering could be performed by the location aggregator 20.

Regarding ranking, filtering, or consolidating operations, different kinds of logic functions could be chosen by a user and implemented as follows. Any logic function or process that is used for ranking, filtering, or consolidating location data is called a "logician." To "invoke" or "implement" a logician is to employ the logician for ranking, filtering, or consolidating certain location data. As a result of the API call GetLogicianTypes ( ) 331, logic descriptions 330 returns logician types 332. This represents choices being presented to a user. As a result of the API call GetLogician (logician) 341, logic bean factory 340 returns logician 342. This represents a user choosing a kind of logic function to implement. User preferences regarding logic functions could be stored in and retrieved from subscriber preferences database 390. As a result of the API call logician.invoke (LocationList) 351, logic implementation 350 returns newLocationList 352. This represents a chosen kind of logic function being implemented to rank, filter, or consolidate location data. (Logic implementation 350 corresponds with location logician 30 shown in the simplified diagram in FIG. 1.) By publishing new location list 322 to subscriber application 40, the system provides a user with location data that is ranked, filtered, or consolidated.

The system may rank items in a collection of location information, according to expected utility. A user who is tracking the locations of another user may be provided with location data such that a higher ranking is given to data from location sources that indicate more recent movement. This is an example of ranking data according to which location source moved more recently, and thus generated the most recent location update. In the invention as currently implemented, each Location XML entry has a time stamp, and collections of location data are sorted by time stamp. In another example of ranking, a user who is tracking the locations of another user may be provided with location data such that a higher ranking is given to data from location sources that are expected to be more accurate than the other location sources. Another option would give a higher ranking to data from location sources that are capable of more precise measurement.

To give an example of filtering data, sudden small changes in reported location could be caused by random variation in location measurement, not actual movement. This is a type of noise that can be filtered out, by setting limits on which pieces of new location data are added to a collection of current location data. Thus the system may filter data to remove misleading data.

The present invention would be capable of consolidating location data found in a collection of location data, to determine the most likely location of a user. For example, a user may be provided with the most likely location of another user who is being tracked, as a result of the system determining a consensus location, based on data from more than one location source. A consensus location, indicated by data from more than one location source, would provide greater certainty than data from any one location source taken alone.

Through feedback from users regarding actual location, and conventional artificial intelligence algorithms, the system could learn to improve its performance. The system could learn which location source, or combination of location sources, are most useful.

To continue with an example given above, an employer may use location information from employees' mobile electronic devices to determine the employees' location. This system would help the employer make good decisions about dispatching employees to make sales calls or service calls. The present invention would make such a system more useful. An employer could use the present invention as follows. Referring again to FIG. 3, logic descriptions 330 returns logician types 332. This represents choices being presented to a user, such as an employer. The choices may be presented in a menu, including "most-recently-moved," "most precise," and other options. Logic bean factory 340 returns logician 342. This represents a user choosing a kind of logic function to implement. An employer may choose "most-recently-moved." For this logician, the rule could be stated this way: "rank data according to which location source moved more recently, and thus generated the most recent location update." This is an example of ranking items in a collection of location information, according to expected utility.

To continue with an example given above, a husband and wife may share a tracking device that is embedded in their car. In addition, the husband may have a two-way pager with GPS capability. At mid-day, perhaps the shared car has not moved for a few hours, but the husband with his two-way pager has been moving frequently. The husband may have moved around the employer's plant, and then traveled in an employer-owned vehicle to call on a customer. The employer may track the husband. Logic implementation 350 returns newLocationList 352. This represents a "most-recently-moved" logic function being implemented to rank location data. By publishing new location list 322 to subscriber application 40, the system provides the employer with location data that is ranked. Location data from the husband's two-way pager would be at the top of the list, ranked above location data from the shared car that has not moved for a few hours. The list may appear as a list of entries like the example in FIG. 8 below. Subscriber application 40 could help the employer to interpret the location data by displaying a map, for example. Subscriber application 40 could display a simplified version of the location data, to suit a user's preferences. The following table is a simplified example of a collection of location data regarding a user, such as the husband in the preceding example:

| | Location data for husband | |
|---|---|---|
| Rank | Location Source | Location |
| 1. | Pager | Latitude = N374820 Longitude = W1222738 |
| 2. | Car | Latitude = N374822 Longitude = W1222740 |

Such a collection could include entries from additional location sources such as a calendar or cell phone.

Figure 4:
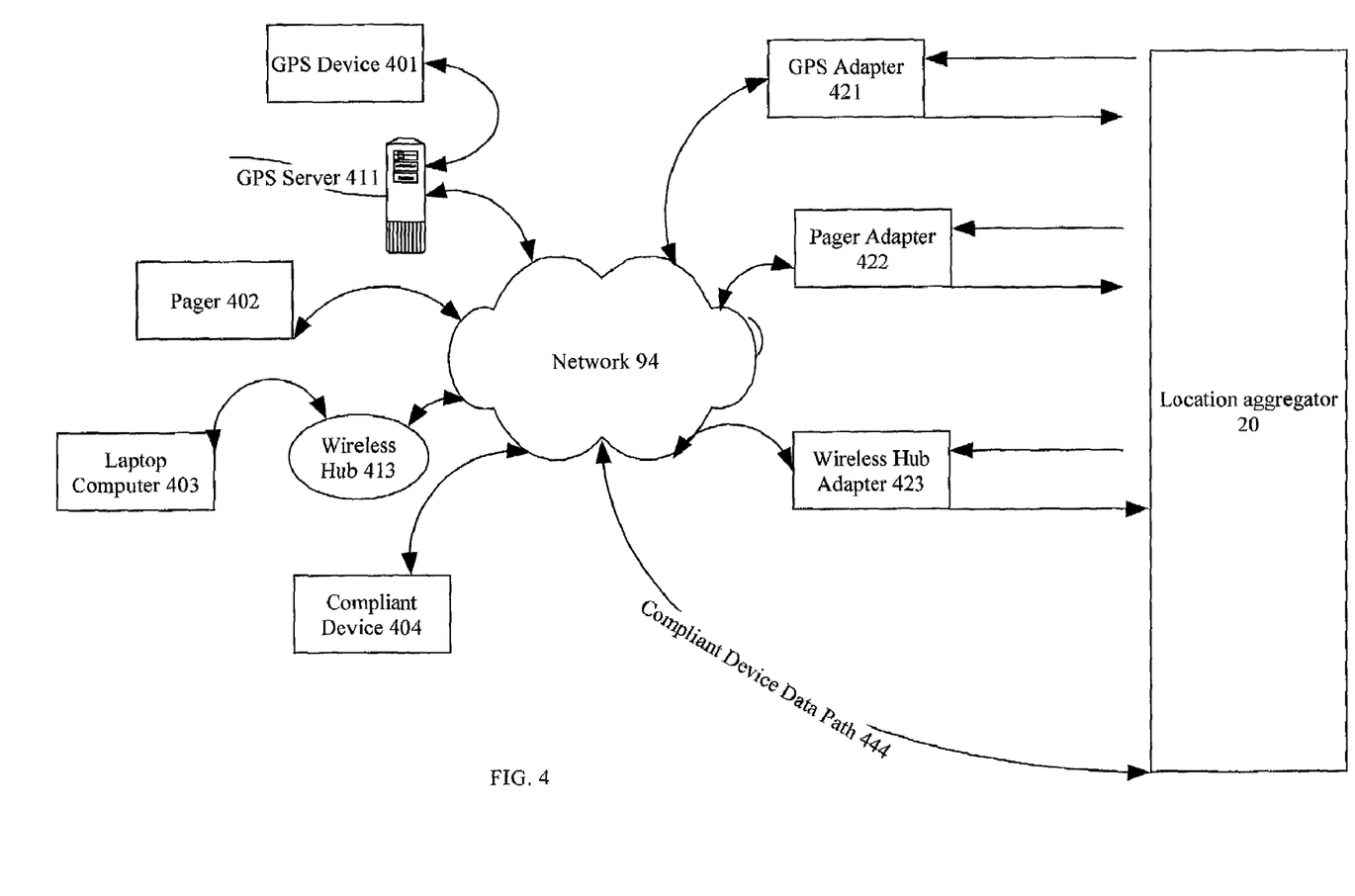
FIG. 4 is a high-level block diagram illustrating an example of a system for acquiring and aggregating location information, according to the teachings of the present invention.

FIG. 4 is a high-level block diagram illustrating an example of a system for acquiring and aggregating location information, according to the teachings of the present invention. In this example, location aggregator 20 polls location sources GPS server 411, a two-way pager, referred to as pager 402, a wireless LAN hub, referred to as wireless hub 413, and a compliant device 404 for location data. Location aggregator 20 acquires location data regarding a user, or more than one user, and creates collections of said location data regarding a user, or more than one user, organized by user.

Output from location sources could be in hypertext markup language (HTML), extensible markup language (XML), or some other language. In the invention as currently implemented, location information is acquired through adapters: GPS adapter 421, pager adapter 422, and wireless hub adapter 423. These adapters convert location data from various location sources to a single format. These adapters are useful for location sources ("legacy" location sources, for example) that give location data in something other than a single desired format in XML. In the invention as currently implemented, the single format was one implemented in XML, named "Location XML," or "LocXML," but another format could be used. There are a few existing formats for location data from mobile electronic devices, and servers associated with these devices. Some day, there might be a single, generally accepted, standard format so that data could be acquired directly rather than through adapters. Thus FIG. 4 shows location information could be acquired directly, from a compliant device 404 (i.e. a device whose output complies with a desired format) via compliant device data path 444.

In the invention as currently implemented, GPS Adapter 421 reads GPS data from GPS server 411, giving the location of a car containing GPS device 401. Pager adapter 422 receives e-mail from a two-way pager, pager 402; within the e-mail message is GPS data, or the name of a cell that pager 402 is currently associated with. The name of a cell is used with a lookup table to map that name to an actual location. Wireless hub adapter 423 receives location data regarding laptop computer 403, which is on a wireless LAN with wireless hub 413. Using Simple Network Management Protocol (SNMP, a protocol that gathers information from networking hardware), wireless hub adapter 423 derives location information from the location of laptop computer 403's wireless Internet connection.

Many other similar adapters could be implemented. A further example would be an adapter that would read a computer-based calendar to give a person's expected location, depending on the date and time. Adapters are further described below, in connection with FIG. 5.

Figure 5:
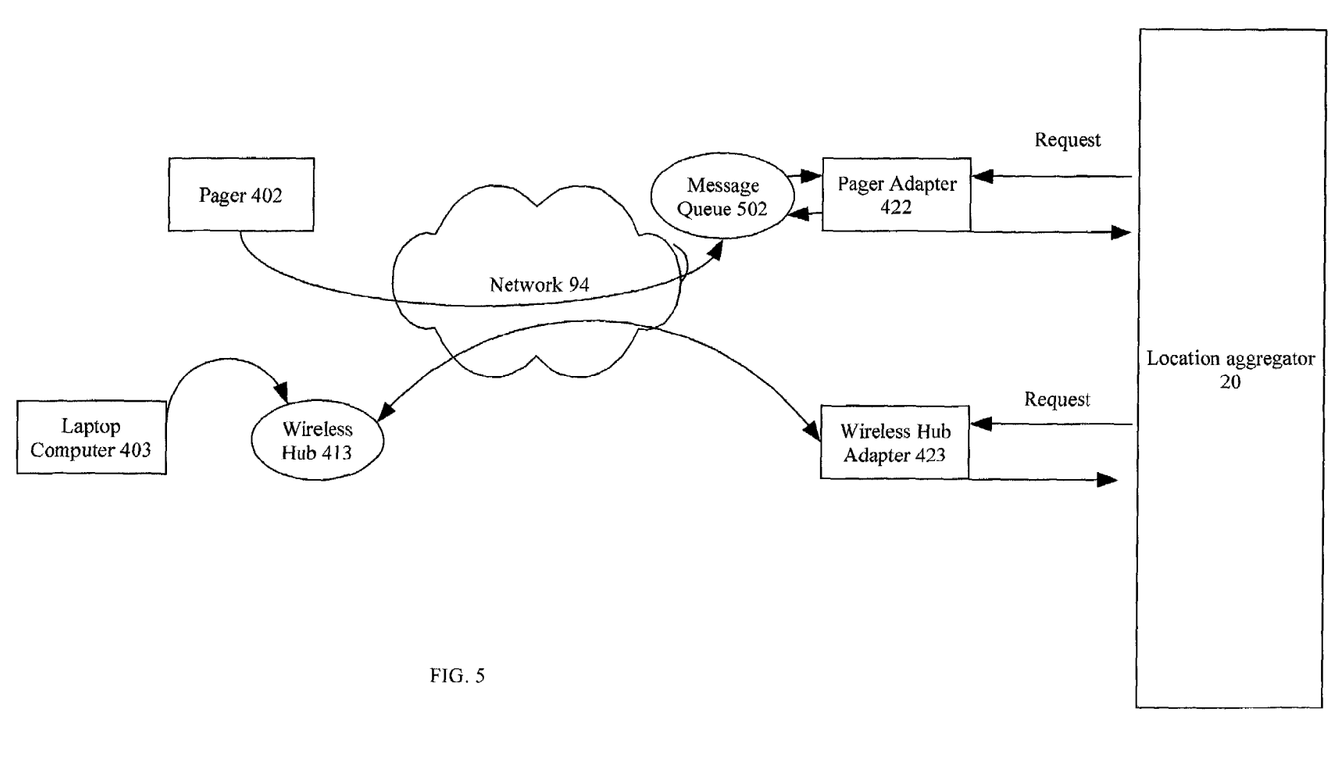
FIG. 5 is a block diagram illustrating in greater detail selected components that may be included in the exemplary system of FIG. 4.

FIG. 5 is a block diagram illustrating in greater detail selected components that may be included in the exemplary system of FIG. 4. Pager 402 a two-way pager. In the invention as currently implemented, a two-way pager available from Research In Motion was used. Other similar devices of the kind available from Motorola, for example, could be used. Pager 402 has a client application running which intelligently selects whether to send the identification number of the radio tower the pager is currently communicating with, or the latitude and longitude coordinates generated by an attached GPS unit. Criterion used in the selection process include GPS signal strength, radio tower signal strength, and frequency of movement.

Communication protocol is as follows. Pager 402's client application sends with varying frequency messages to a server's message queue 502 (a POP Server). The messages contain location information in the format: DEVICEID, TOWERID, GPRMC, POS_UTC, POS_STAT, LAT, LAT_REF, LON, LON_REF, SPD, HDG, DATE. The GPS fields will have a zero value when GPS data is not available. The messaging method implemented was electronic mail sent via simple mail transfer protocol (SMTP).

Pager adapter 422 is a multi-threaded servlet. A servlet is a Java application that runs on a server. Pager adapter 422 has a background thread which on preset intervals checks message queue 502 for new messages received from pager 402. The messaging system is used to avoid possible firewall and security issues in corporate environments. This background thread parses pertinent information from the pager 402s' e-mails into an internal location hashtable. Another thread in pager adapter 422, which handles hypertext transfer protocol (HTTP) requests, is invoked by the location aggregator 20. Pager adapter 422 upon such request takes information from its internal location hashtable and outputs it in Location XML to location aggregator 20.

A Document Type Definition (DTD) is a definition of a markup language. The following is the DTD for Location XML that was used in the invention as currently implemented:

```
<!--DTD for location information from mobile devices-->
<!ELEMENT LocationInformation (MobileDevice+)>
<!ELEMENT MobileDevice (Geographic+,TowerID?)>
<!ATTLIST MobileDevice TrackID CDATA #REQUIRED>
<!ATTLIST MobileDevice RequestTime CDATA #REQUIRED>
<!ATTLIST MobileDevice ErrorCode CDATA #REQUIRED>
```

-continued

```
<!ELEMENT Geographic (GeodeticDatum, HeightDatum, Region)>
<!ATTLIST Geographic Velocity CDATA #IMPLIED>
<!ATTLIST Geographic PositionTime CDATA #REQUIRED>
<!ELEMENT GeodeticDatum (WGS-84 | BESSEL-1841)>
<!ELEMENT WGS-84 (LatLong | UTM)>
<!ELEMENT LatLong EMPTY>
<!ATTLIST LatLong PositionFormat (IDMS0 | IDMS3) #REQUIRED>
<!ATTLIST LatLong Latitude CDATA #REQUIRED>
<!ATTLLST LatLong Longitude CDATA #REQUIRED>
<!ELEMENT UTM EMPTY>
<!ATTLIST UTM PositionFormat (2 | 4) #REQUIRED>
<!ATTLIST UTM Easting CDATA #REQUIRED>
<!ATTLIST UTM Northing CDATA #REQUIRED>
<!ATTLIST UTM Zone CDATA #REQUIRED>
<!ATTLIST UTM ZoneDesignator CDATA #REQUIRED>
<!ELEMENT BESSEL-1841 (RTS-90)>
<!ELEMENT RTS-90 EMPTY>
<!ATTLIST RTS-90 PositionFormat (IDMS0 | IDMS3) #REQUIRED>
<!ATTLIST RTS-90 Latitude CDATA #REQUIRED>
<!ATTLIST RTS-90 Longitude CDATA #REQUIRED>
<!ELEMENT HeightDatum EMPTY>
<!ATTLIST HeightDatum HeightFormat (meters | yards) #REQUIRED>
<!ATTLIST HeightDatum HeightValue CDATA #REQUIRED>
<!ELEMENT Region EMPTY>
<!ATTLIST Region RadiusFormat (meters | yards) #REQUIRED>
<!ATTLIST Region InnerRadius CDATA "0">
<!ATTLIST Region OuterRadius CDATA "0">
<!ATTLIST Region StartAngle CDATA "0">
<!ATTLIST Region StopAngle CDATA "360">
<!ATTLIST Region LevelOfConfidence CDATA "100">
<!ELEMENT TowerID EMPTY>
<!ATTLIST TowerID PositionTime CDATA #REQUIRED>
<!ATTLIST TowerID Name CDATA #REQUIRED>
<!ATTLIST TowerID Type CDATA #REQUIRED>
```

Location aggregator 20 queries pager adapter 422 and other adapters and location sources via HTTP on preset intervals. Location aggregator 20 retrieves pager adapter 422's current list of tracked devices and locations in Location XML.

Laptop computer 403 has a service running which periodically makes an HTTP request to the wireless hub adapter 423 to authorize wireless hub adapter 423 to report laptop computer 403's location to location aggregator 20.

Wireless hub 413 is a wireless LAN hub with a built-in webserver that displays pages that can be used to configure the hub and view information about the hub. In the invention as currently implemented, a wireless LAN hub available from Cisco Systems, Inc. was used, but other similar devices of the kind available from Apple Computer, Inc., Compaq Computer Corporation, Intel Corporation, Lucent Technologies Inc., or 3Com Corporation could be used.

Wireless hub adapter 423, a multi-threaded servlet, has a background thread which on preset intervals makes an HTTP request to any number of wireless LAN hubs like wireless hub 413, to retrieve an HTML page containing a table of attached clients and their internet protocol (IP) address on each hub's network. This information is then parsed into a hub hashtable with the key being the IP address of each wireless hub 413 client, and the value being the hub each client is using. Also in wireless hub adapter 423, there is a thread which handles incoming HTTP requests. In this wireless hub adapter 423, there are two types of such requests. The first is the type of requests received from laptop computer 403. These requests simply give the server permission to disclose the laptop computer 403's location (which is obtained by the background thread) to location aggregator 20. Specifically each HTTP header is examined for the originating IP address. This IP address and the time of reception is stored in the authorization hashtable. The other type of HTTP request received is from location aggregator 20. Each time wireless hub adapter 423 receives such a request, it iterates through the authorization hashtable and for each IP address who has sent authorization recently (according to a preset value), the corresponding hub information from wireless hub 413's hashtable is retrieved. This information is then parsed appropriately into location XML.

Location aggregator 20 queries wireless hub adapter 423 and other adapters and location sources via HTTP on preset intervals. Location aggregator 20 retrieves wireless hub adapter 423's current list of tracked devices and locations in Location XML.

Figure 6:
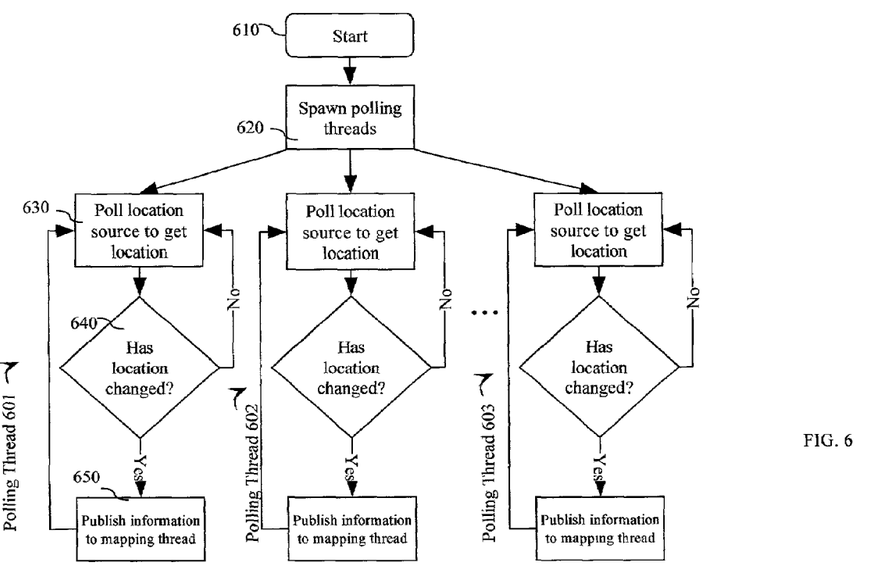
FIG. 6 is a flow chart illustrating one type of process for acquiring and aggregating location information, as implemented in an exemplary embodiment.

FIG. 6 is a flow chart illustrating one type of process for acquiring and aggregating location information, as implemented in an exemplary embodiment. Within location aggregator 20, shown in FIGS. 1, 3, 4, and 5, the process starts 610. Any number of polling processes (three are shown as examples: 601, 602, and 603), called "polling threads," are spawned, 620. Each polling thread polls a location source for location data via HTTP 630. Each polling thread determines whether any of said location data is new (decision 640). Each polling thread sends (step 650) any new location data to a mapping process. The mapping process, called a "mapping thread," is further described below in connection with FIG. 7. Steps 630, 640, and 650 are repeated until the polling threads are terminated. In this way, the location data are updated continuously.

Figure 7:
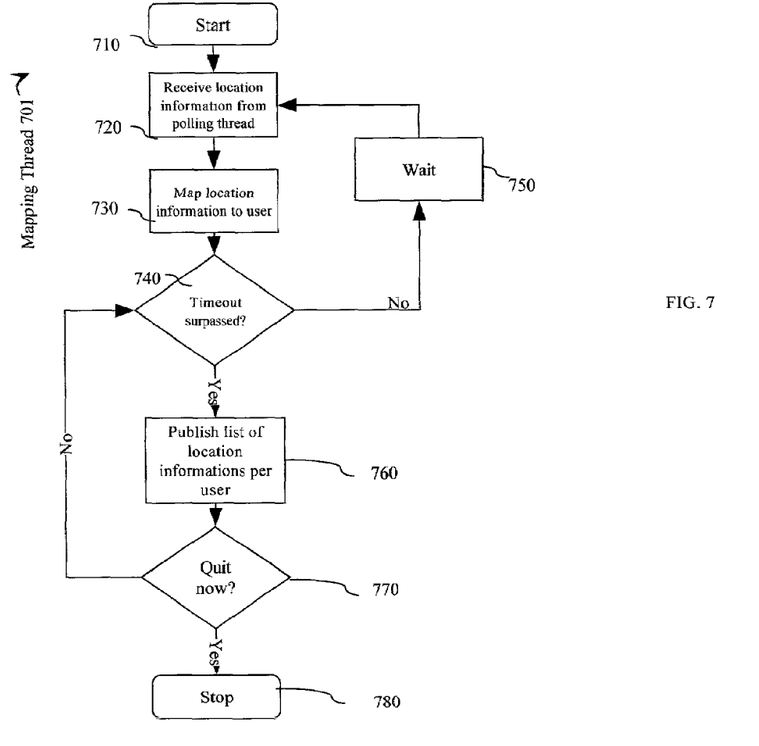
FIG. 7 is a flow chart illustrating another process, related to the type shown in FIG. 6, for acquiring and aggregating location information, as implemented in an exemplary embodiment.

FIG. 7 is a flow chart illustrating another process, related to the type shown in FIG. 6, for acquiring and aggregating location information, as implemented in an exemplary embodiment. Along with polling threads such as 601, 602, and 603, shown in FIG. 6, mapping thread 701 is started 710, and receives new location data 720 from polling threads such as 601, 602, and 603. Mapping thread 701 maps new location data to users 730.

Next, this example includes an optional "timeout" step (decision 740), causing the mapping thread to wait (750). This will be explained below. After waiting for the prescribed time, the "Yes" branch is taken at decision 740, and the mapping thread sends (step 760) collections of location data, organized by user, to a logic process, that performs evaluation (e.g. ranking or filtering operations) on the data before providing the information to a user through a subscriber application.

A "timeout" step (decision 740) is designed to ensure that many pieces of new location data are received from the polling threads such as 601, 602, and 603, shown in FIG. 6, in a "round." In other words, the output provided by step 760 is more valuable if it includes more than one piece of new location data. In order to receive more than one piece of new location data, mapping thread 701 must wait until more of the polling threads such as 601, 602, and 603 send (step 650) any new location data to mapping thread 701. The value of the timeout is a tradeoff of how many pieces of new location data are published by step 760, and the time between those publications.

The above steps 720, 730, and 760 are repeated until the "Yes" branch is taken at decision 770 and the mapping thread is terminated 780. In this way, the collections of location data are updated continuously.

Figure 8:
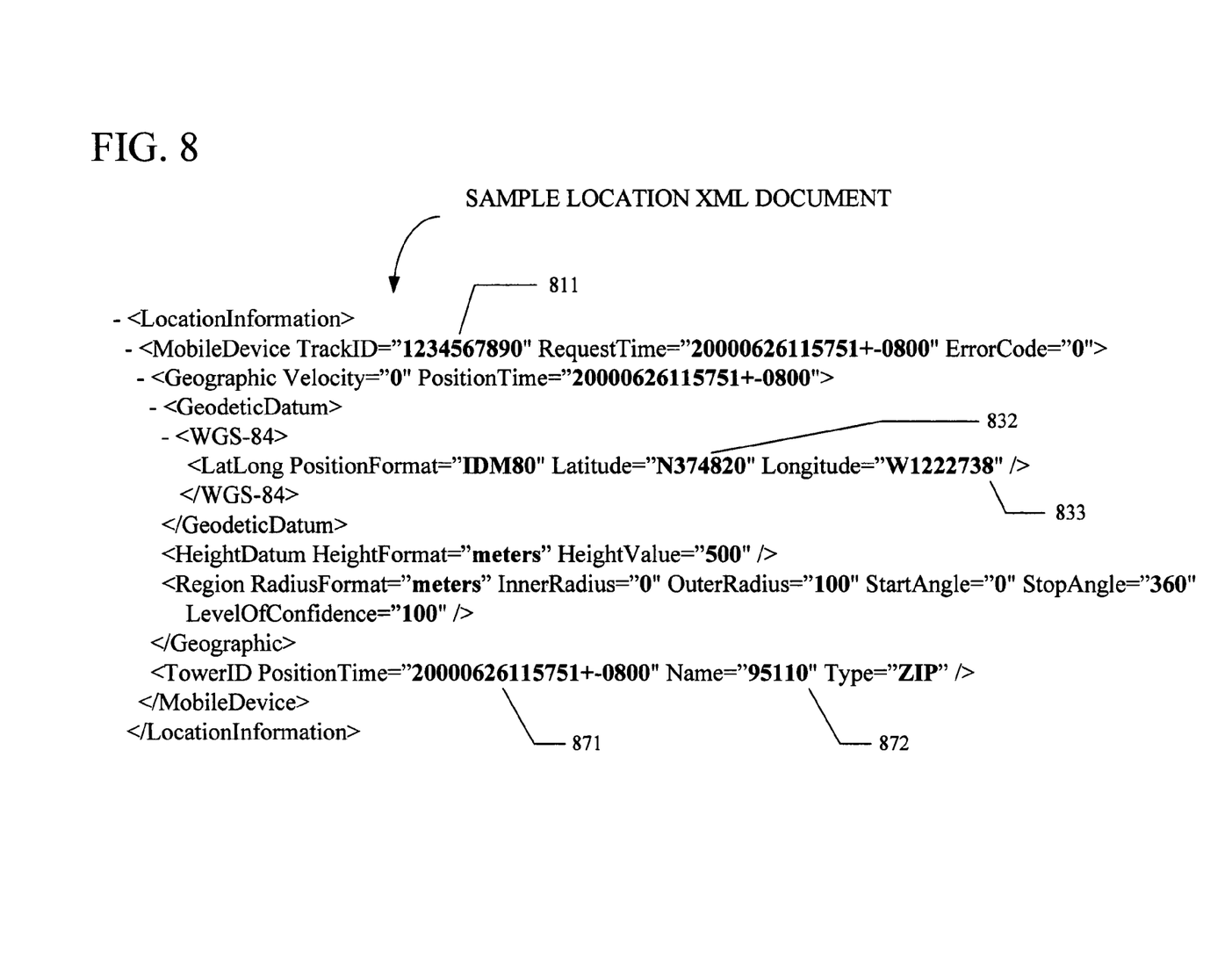
FIG. 8 is a sample Location XML document, according to the teachings of the present invention, showing location data from a two-way pager with GPS capability, as viewed with a browser.

The collections of location data are collections of entries like the example in FIG. 8, which is a sample Location XML document, showing location data from a two-way pager with GPS capability, as viewed with a browser. FIG. 8 includes an identification number (811) for a mobile device (a two-way pager in this example), latitude (832) and longitude (833) coordinates generated by an attached GPS unit, a time stamp (871), and an identification number (872) for the radio tower the pager is currently communicating with. The Location XML output from adapters shown in FIGS. 3, 4, and 5 consist of entries like the example in FIG. 8.

One of the preferred implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

A portion of the disclosure of this patent document contains material which is subject to copyright or trademark protection. The copyright or trademark owner has no objection to the facsimile reproduction by anyone of the patent disclosure, as it appears in the Patent and Trademark Office patent files or records, but otherwise reserves all copyright or trademark rights whatsoever.

We claim:

1. A method for aggregating location information, said method comprising:
    acquiring location data from a plurality of location sources, wherein each location source of the plurality of location sources corresponds to a different mobile device of a plurality of mobile devices and each mobile device of the plurality of mobile devices corresponds to a particular user;
    creating a collection of said location data regarding said user;
    calculating a location of said user from the collection of said location data; and converting said location data from said location sources to a single format.

2. The method of claim 1, wherein at least one of said location sources is a two-way pager, and said single format is one implemented in extensible markup language (XML).

3. The method of claim 1, wherein at least one of said location sources is a wireless LAN hub, and said single format is one implemented in extensible markup language (XML).

4. The method of claim 1, wherein said location data are updated continuously.

5. The method of claim 1, wherein:
said acquiring further comprises acquiring location data regarding more than one user;
said creating further comprises creating collections of said location data regarding more than one user, organized by user; and
said calculating a location further comprises calculating a location of each user of the more than one users.

6. The method of claim 5, wherein said acquiring further comprises converting said location data from said location sources to a single format.

7. The method of claim 6, wherein at least one of said location sources is a two-way pager, and said single format is one implemented in XML.

8. The method of claim 6, wherein at least one of said location sources is a wireless LAN hub, and said single format is one implemented in XML.

9. The method of claim 5, wherein said location data are updated continuously.

10. An information handling system for aggregating location information, said information handling system comprising:
means for acquiring location data regarding a user from a plurality of location sources, wherein each location source of the plurality of location sources corresponds to a different mobile device of a plurality of mobile devices and each mobile device of the plurality of mobile devices corresponds to said user;
means for creating a collection of said location data regarding said user;
means for calculating a location of said user from the collection of said location data and;
means for converting said location data from said location sources to a single format.

11. The information handling system of claim 10, wherein at least one of said location sources is a two-way pager, and said single format is one implemented in XML.

12. The information handling system of claim 10, wherein at least one of said location sources is a wireless LAN hub, and said single format is one implemented in XML.

13. The information handling system of claim 10, wherein said location data are updated continuously.

14. The information handling system of claim 10, wherein:
said means for acquiring further comprises means for acquiring location data regarding more than one user;
said means for creating further comprises means for creating collections of said location data regarding more than one user, organized by user; and
said means for calculating a location of said user further comprises means for calculating a location for each user of the more than one user.

15. The information handling system of claim 14, wherein said means for acquiring further comprises means for converting said location data from said location sources to a single format.

16. The information handling system of claim 15, wherein at least one of said location sources is a two-way pager, and said single format is one implemented in XML.

17. The information handling system of claim 15, wherein at least one of said location sources is a wireless LAN hub, and said single format is one implemented in XML.

18. The information handling system of claim 14, wherein said location data are updated continuously.

19. An information handling system for aggregating location information, said information handling system comprising:
a communication device communicating with a network;
a storage device;
an output device;
a system bus; and
a processor, coupled by said system bus to said communication device, said storage device, and said output device, said processor programmed to implement a method comprising:
acquiring location data regarding a user from a plurality of location sources, wherein each location source of the plurality of location sources corresponds to a different mobile device of a plurality of mobile devices and each mobile device of the plurality of mobile devices corresponds to said user;
converting said location data from said location sources to a single format;
creating a collection of said location data regarding said user; and
updating said location data continuously.

20. The information handling system of claim 19, said processor being programmed to implement a method wherein:
said acquiring further comprises acquiring location data regarding more than one user, and;
said creating further comprises creating collections of said location data regarding more than one user, organized by user.

21. A computer-usable medium having computer-executable instructions, comprising:
means for acquiring location data regarding a user from a plurality of location sources, wherein each location source of the plurality of location sources corresponds to a different mobile device of a plurality of mobile devices and each mobile device of the plurality of mobile devices corresponds to said user;
means for creating a collection of said location data regarding said user;
means for calculating a location of said user based upon the collection of said location data; and
means for converting said location data from said location sources to a single format.

22. The computer-usable medium of claim 21, wherein at least one of said location sources is a two-way pager, and said single format is one implemented in XML.

23. The computer-usable medium of claim 21, wherein at least one of said location sources is a wireless LAN hub, and said single format is one implemented in XML.

24. The computer-usable medium of claim 21, wherein said location data are updated continuously.

25. The computer-usable medium of claim 21, wherein:
said means for acquiring further comprises means for acquiring location data regarding more than one user;

said means for creating further comprises means for creating collections of said location data regarding more than one user, organized by user; and said means for calculating a location of said user further comprises means for calculating a location for each user of the more than one user.

26. The computer-usable medium of claim 25, wherein said means for acquiring further comprises means for converting said location data from said location sources to a single format.

27. The computer-usable medium of claim 26, wherein at least one of said location sources is a two-way pager, and said single format is one implemented in XML.

28. The computer-usable medium of claim 26, wherein at least one of said location sources is a wireless LAN hub, and said single format is one implemented in XML.

29. The computer-usable medium of claim 25, wherein said location data are updated continuously.

* * * * *